United States Patent [19]

Setaishi et al.

[11] Patent Number: 5,163,988
[45] Date of Patent: Nov. 17, 1992

[54] METHOD OF PREVENTING TWISTING OF A FUSHION-SPLICED, TUBE-REMOVED FIBER PORTION IN THE PROCESS OF ENCASING THE FIBER PORTION IN A CASING

[75] Inventors: Yukio Setaishi, Yachimata; Mikio Yoshinuma, Yachiyo; Masao Ooba, Kokybunji, all of Japan

[73] Assignees: Fujikura Ltd.; Nippon Telegraph & Telephone Corporation, both of Tokyo, Japan

[21] Appl. No.: 634,085

[22] Filed: Dec. 26, 1990

[30] Foreign Application Priority Data

Apr. 3, 1990 [JP] Japan ................. 2-88736
Apr. 3, 1990 [JP] Japan ................. 2-88737

[51] Int. Cl.⁵ .................. C03B 23/20; G02B 6/36
[52] U.S. Cl. ........................... 65/4.1; 65/4.21; 156/158; 385/96; 385/135
[58] Field of Search ............ 156/158; 65/4.1, 4.21; 350/96.2; 53/430, 473; 385/96, 135

[56] References Cited

U.S. PATENT DOCUMENTS

| | | | |
|---|---|---|---|
| 3,167,895 | 2/1965 | Egler et al. | 53/473 |
| 4,171,867 | 10/1979 | Cocito | 350/96.21 |
| 4,274,707 | 6/1981 | Pacey et al. | 65/4.21 |
| 4,359,262 | 11/1982 | Dolan | 350/96.2 |
| 4,428,645 | 1/1984 | Korbelak et al. | 350/96.2 |
| 4,722,585 | 2/1988 | Boyer | 350/96.2 |
| 4,840,449 | 6/1989 | Ghandeharizadeh | 350/96.2 |
| 4,884,863 | 12/1989 | Throckmorton | 350/96.2 |
| 4,900,121 | 2/1990 | Becker et al. | 350/96.2 |
| 4,932,744 | 6/1990 | Messelhi | 350/96.2 |

FOREIGN PATENT DOCUMENTS

| | | |
|---|---|---|
| 0185923 | 7/1986 | European Pat. Off. . |
| 2914217 | 10/1980 | Fed. Rep. of Germany . |
| 3405309 | 8/1985 | Fed. Rep. of Germany . |
| 3413401 | 10/1985 | Fed. Rep. of Germany . |
| 0062605 | 4/1983 | Japan .................. 350/96.2 |
| 0005927 | 5/1990 | PCT Int'l Appl. .......... 350/96.2 |

Primary Examiner—Michael W. Ball
Assistant Examiner—Steven D. Maki
Attorney, Agent, or Firm—Frishauf, Holtz, Goodman & Woodward

[57] ABSTRACT

In a method of preventing twisting of a fusion-spliced optical fiber in the process of encasing the optical fiber in a casing, one of a pair of optical fibers is wound N turns in one direction to form a first coil. Another of the pair of optical fibers is wound N turns in another direction opposite to the direction to form a second coil. Ends of remainder portions of the optical fibers which are not wound are fusion-spliced to each other to form a fusion-spliced portion. The fusion-spliced portion is fixed within a casing. The remainder portions of the optical fibers are pushed into the casing to expand the first and second coils.

11 Claims, 7 Drawing Sheets

METHOD OF PREVENTING TWISTING OF A FUSHION-SPLICED, TUBE-REMOVED FIBER PORTION IN THE PROCESS OF ENCASING THE FIBER PORTION IN A CASING

BACKGROUND OF THE INVENTION

1. Field of the Invention

The present invention relates to a method of preventing twisting of a fusion-spliced, tube-removed fiber portion in the process of encasing the fiber portion, in a coil form, in a casing.

2. Description of the Related Art

In a conventional process of fusion-splicing a pair of optical fiber cords, first, the protective tubes of the fiber cords are removed over a predetermined length, generally, 1 meter, from the ends of the fibers, which are to be fusion-spliced. Next, the coating layers of the fibers are stripped off over a predetermined length from the ends of the fibers, which are fusion-spliced. Thereafter, the coating layer stripped fiber portions are disposed on a pair of supporting members of a fusion splicing apparatus, with the fiber ends facing to one another. Thereafter, the fibers are moved to contact each other, while applied with arc discharge to the fiber ends, so that the fibers are fusion spliced. However, there is a case where the cores of the fibers are in misalignment. In another case, the fusion-spliced portion does not have sufficient mechanical strength. In such cases, the operator removes the fibers from the supporting members and cuts off the tip portions of the fibers by a predetermined length, generally, 35 mm, from the fusion-spliced portion. The fibers are again subjected to the above processes. This sequence is repeated until a good fusion-splicing is obtained. Taking into consideration a case where such a defective fusion-splicing may occur several times, the length of the portion of each of the fibers where the protective tube is removed is generally set to about 1 meter. This portion of the fiber is referred to as "tube removed fiber portion".

Figure 1A:
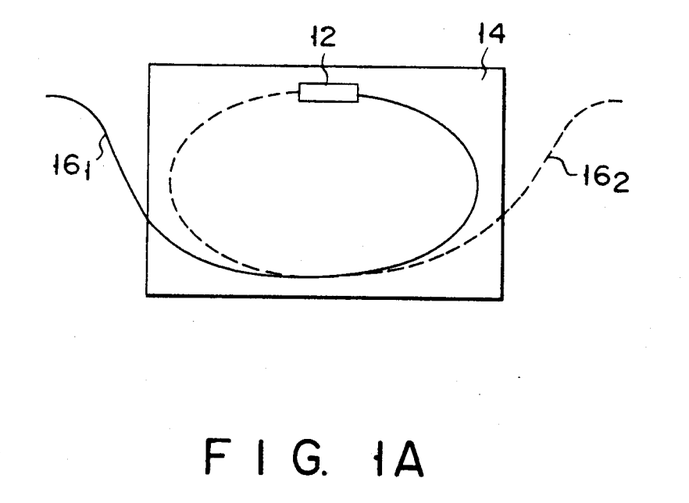
FIGS. 1A and 1B each show a fusion-spliced optical fiber contained in a casing.
Figure 1B:
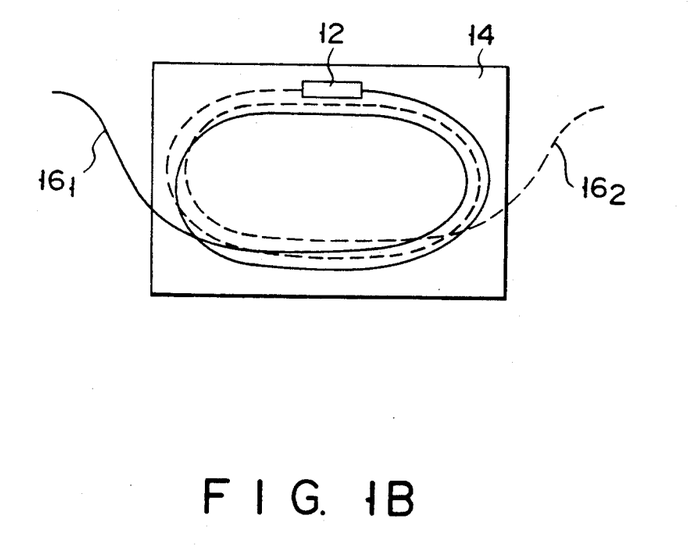

When a good fusion-splicing is once obtained, the fusion-spliced fiber comprising the tube-removed fiber portions $16_1$ and $16_2$ is removed from the fusion-splicing apparatus, and put into a casing 14 to be held therein, as shown in FIG. 1A. Specifically, referring to FIG. 1A, the fusion-spliced portion 12 of the fusion-spliced fiber is fixed in a casing 14 as shown in FIG. 1A. Thereafter, the tube-removed fiber portions $16_1$ and $16_2$ of the fusion-spliced fiber are coiled as illustrated in FIGS. 1A and 1B. Next, a cover (not shown) of the casing 14 is closed to seal therein the fiber portion $16_1$ and $16_2$.

It is observed that coiling confronts subsequent twisting, and that the degree of twisting grows as the number of turns increases. As shown in FIG. 1A, the initial turn of coiling entails twisting with the upper fiber portion, for example, $16_1$ at an intersection of the fiber portions $16_1$ and $16_2$, and further twisting emerge with every other turn of even numbers. It is likewise observed that the initial turn of coiling does not give rise to twisting with the lower fiber portion, for example, $16_2$ but subsequent turns of the odd numbers after the third bring about twisting each.

The tube-removed fiber portions $16_1$ and $16_2$ are each generally coiled in the form of a 3-turn. In such a case, the twisting occurring is as intensive as not negligible with regard to optical characteristics, thereby inflicting the fibers some loss of optical transmission. It must also be noted that the optical fiber interfere with deformation of the cable due to twisting, whereby resulting in causing ease for the coiled optical fiber to spring up, getting out of the casing, with safe workability to encase a coiled optical fiber and close a casing cover subsequently thus lessened.

SUMMARY OF THE INVENTION

In respect of the above-mentioned circumstances, the present invention was devised to provide a method of preventing twisting the fusion-spliced, tube-removed fiber portions in the process of encasing the fiber portion, in a coilform, in a casing, whereby the fiber portions may be encased without undergoing twisting, springing up, and getting out of the casing, and workability of encasing the fiber portions may be improved.

According to present invention, there is provided a method of preventing twisting of a fusion-spliced optical fiber in the process of encasing the optical fiber in a casing, the method comprising the steps of: (a) winding one of a pair of optical fibers a predetermined number of turns in one direction to form a first coil, (b) restricting the first coil from expanding due to flexibility of the optical fiber, (c) winding another of the pair of optical fibers said predetermined number of turns in another direction opposite to the direction to form a second coil, (d) restrict-ing the second coil from expanding due to flexibility of the optical fiber, (e) fusion-splicing ends of remainder portions of the optical fibers which are not wound to each other, to form a fusion-spliced portion, (f) fixing the fusion-spliced portion within a casing, (g) releasing the restricting of the first and second coils from expanding, and, (h) pressing the remainder portions of the optical fibers into the casing to expand the first and second coils.

According to the present invention, there is further provided a method of preventing twisting of a fusion-spliced optical fiber in the process of encasing the optical fiber in a casing, the method comprising the steps of: (a) winding one of a pair of optical fibers a predetermined number of turns in one direction to form a first coil, (b) restricting the first coil from expanding due to flexibility of the optical fiber, (c) winding another of the pair of optical fibers (N+1) turns in another direction opposite to the direction to form a second coil, (d) restricting the second coil from expanding due to flexibility of the optical fiber, (e) fusion-splicing ends of remainder portions of the optical fibers which are not wound to each other, to form a fusion-spliced fiber with a fusion-spliced portion, (f) turning the fusion-spliced portion half a turn in the one direction to form the fusion-spliced fiber into a ring, (g) turning the ring of the fusion-spliced fiber upside down, (h) fixing the fusion-spliced portion within a casing, (i) releasing the restricting of the second coil from expanding, (j) removing one turn from the second coil so that the number of turns of the second coil equals to that of the first coil, (k) releasing the restricting of the first coil from expanding, and (l) pushing the remainder portions of the optical fibers into the casing to expand the first and second coils.

According to the present invention, there is yet further provided a method of preventing twisting of a fusion-spliced optical fiber in the process of encasing the optical fiber in a casing, the method comprising the steps of: (a) winding one of a pair of optical fibers N turns in one direction to form a first coil, (b) restricting the first coil from expanding due to flexibility of the optical fiber, (c) winding another of said pair of optical fibers (N+1) turns in another direction opposite to said one direction to form a second coil, (d) restricting the second coil from expanding due to flexibility of the optical fiber, (e) fusion-splicing ends of remainder portions of said optical fibers which are not wound to each other, to form a fusion-spliced fiber with a fusion-spliced portion, (f) turning said fusion spliced portion half a turn in said one direction to form said fusion-spliced fiber into a ring, (g) releasing said restricting of said second coil from expanding, (h) removing one turn from said second coil so that the number of turns of the second coil equals to that of said first coil, (i) turning said ring of the fusion-spliced fiber upside down, (j) fixing said fusion-spliced portion within a casing, (k) releasing said restricting of said first coil from expanding, and (l) pushing said remainder portions of said optical fibers into said casing to expand said first and second coils.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 2:
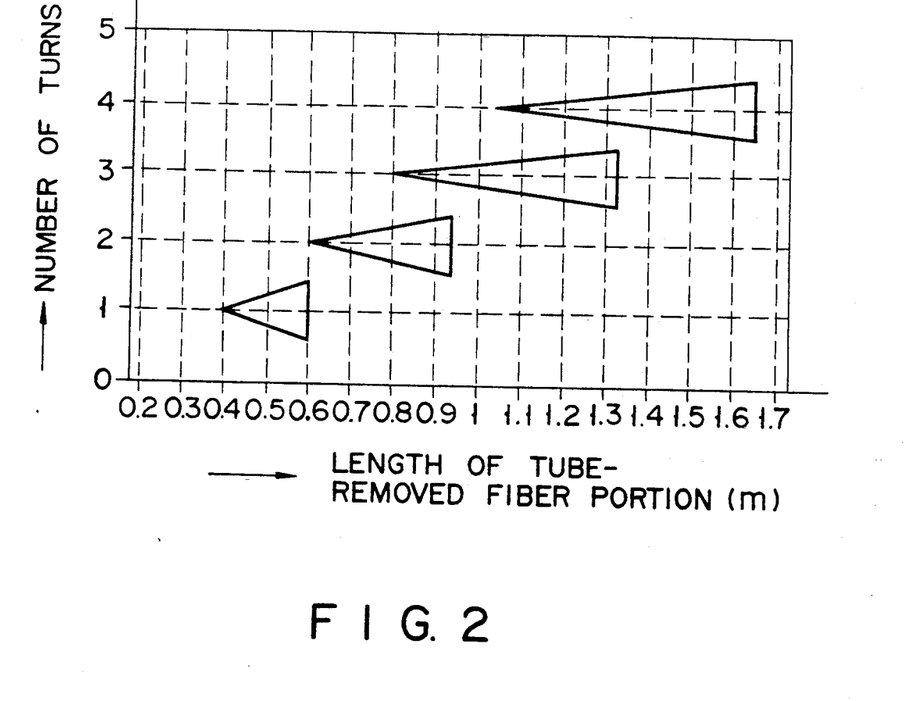
FIG. 2 is a graph showing a relationship between length of a tube-removed fiber portion and the number of turns.

A casing commonly used at present can accommodate a coil whose diameter is 210 through 370 mm long. In case a good fusion-spliced portion were obtained in one attempt of fusion-splicing process, cutting-off of the fiber ends is not required to remove a defective fusion-spliced portion, and the length of each of the tube-removed fiber portions remains unchanged as being 1 m. In this case, it is necessary that each of the tube-removed fiber portions be wound in a three-turn coil so that the coil may be encased. It is accordingly required to wind each tube-removed fiber portion around a fiber winding receiver member to form the three-turn coil. Meanwhile, where a defective fusion-spliced portion is produced, the tube-removed fiber portions must suffer cutting to a length of 35 mm from each end of the fusion-spliced portion, resulting in shortening. Therefore, if the tube-removed fiber portions experience 10 successive attempts of fusion-splicing, with each resulting in producing a defective fusion-spliced portion, the total cut-off length would amount to 350 mm, and the resultant length of each tube-removed fiber portion would be 650 mm. With such tube-removed fiber portion, it is necessary to provide a three-turn coil with each turn measuring a length of 216 mm or a two-turn coil, with each turn measuring 325 mm. Referring to the graph presented in FIG. 2, how is the relationship between the total length of tube-removed fiber portions and the number of turns is appreciated. The abscissa of the graph represents the total length of the tube-removed fiber portions while the ordinate denotes the number of turns. Where there are provided a plurality of triangles which are defined according to the total length of the tube-removed fiber portions, any one of the triangles may be selected to define the number of turns.

By reference to the drawings provided for this specification, the methods disclosed in preferred embodiments of the present invention to prevent twisting a fusion-spliced, tube-removed fiber portions, in the process of encasing the fiber portion, in a coilform, in a casing are described hereunder.

Figure 3:
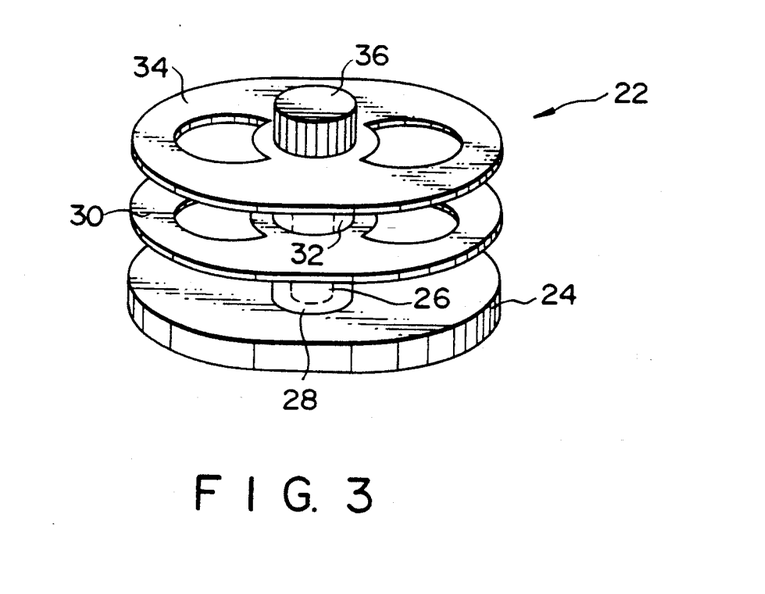
FIG. 3 shows a coil forming jig.

First, referring to FIG. 3, a description is made here of a coil forming jig 22 around which a fusion-spliced, tube-removed fiber portion is wound, and which is disclosed in the embodiment of the present invention. The coil forming jig 22 comprises an ellipsoidal base 24, a cylindrical support 26 extending upward from the central part of the base 24, a lower winding core 28 inserted into the support 26, a center partition comprising elliptic disc 30, an upper winding core 32, an elliptic top disc 34, and a knob member 36 provided at the top of the support 26 to lock the above members through its thread engagement with the support 26.

To make a coil, a fusion-spliced tube-removed fiber portion is wound around the coil forming jig 22, wherein around the lower winding core 28, one fiber portion is first wound N turns in one direction and then, a fiber holder (not shown) is pressure-inserted in between the center partition disc 30 and the ellipsoidal base 24 thereby to lock an optical fiber coil to the lower winding core 28. Successively, around the upper winding core 32, another fiber portion is wound N turns in the direction opposite the above, followed by pressure-inserting a fiber holder (not shown) in between the center partition elliplic disc 30 and the eliptic top disc 34 whereby to another fiber coil to the upper winding core 32.

Figures 4A, 4B, 4C, 4D:
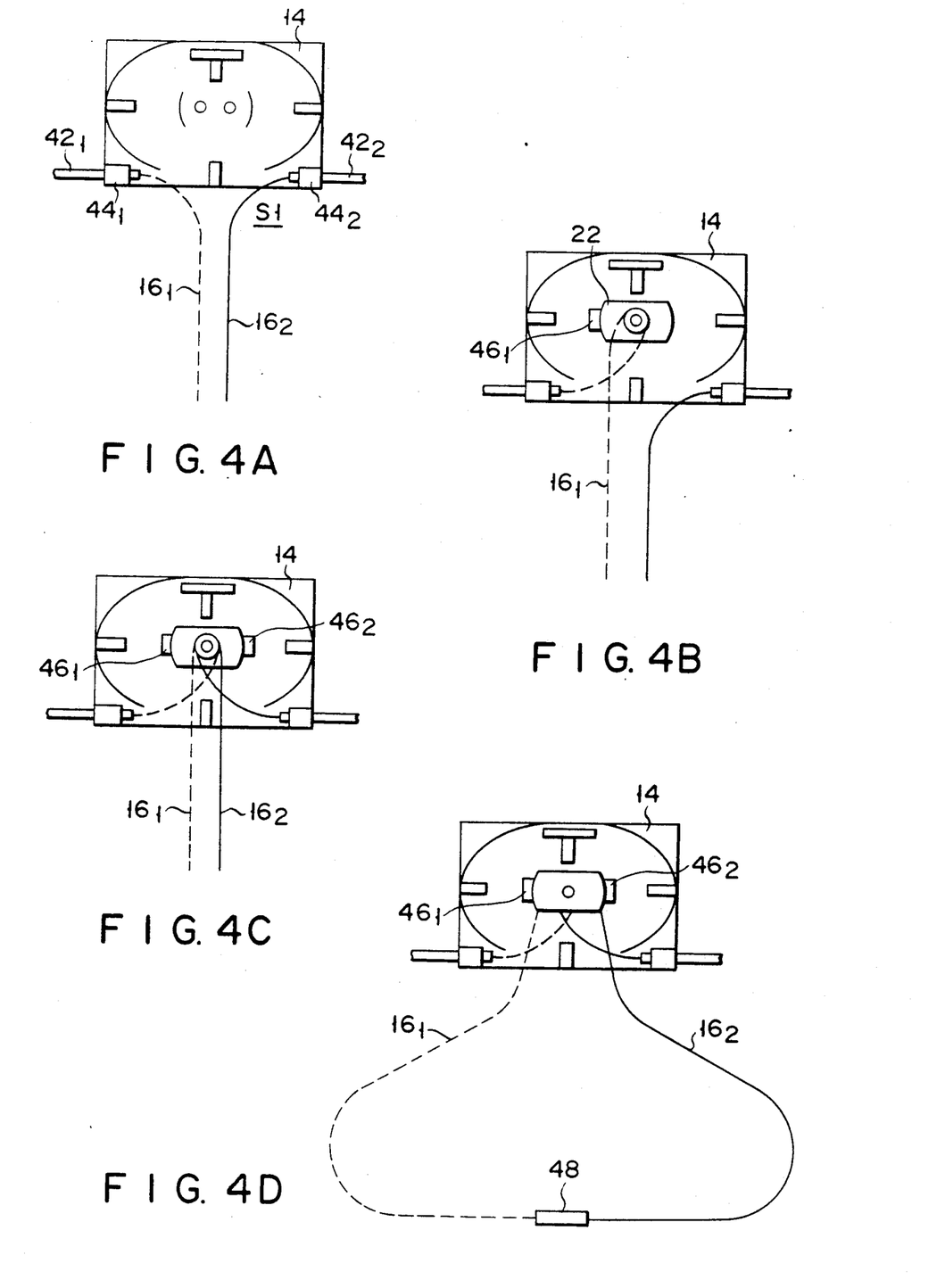
FIGS. 4A-4H show a sequence of encasing an optical fiber in a casing.

As shown in FIG. 4A, a pair of optical fiber cables $42_1$ and $42_2$ are clamped by means of a pair of engaging clamp means $44_1$ and $44_2$ which are provided, respectively at the left and right corners on a side S1 of the rectangular casing 14. The tube-removed fiber portions $16_1$ and $16_2$ extend from the fiber cables $42_1$ and $42_2$ generally by 1 meter, respectively. As shown in FIG. 4B, around the lower winding core 28 situated between the ellipsoidal base 24 and the center partition elliptic disc 30 of the coil forming jig 22 mounted at the center part of the casing 14, the tube-removed fiber portion $16_1$ extending from the left fiber cable $42_1$ is wound N turns in the counterclockwise direction (N=3 in case the tube-removed fiber portion measures 1 m). Then, the optical fiber coil is thrust against the lower winding core 28 with a fiber coil holder member $46_1$ pressure-inserted in between the ellipsoidal base 24 and the center partition elliptic disc 30. As shown in FIG. 4C, around the upper winding core 32 situated between the center partition elliptic disc 30 and the elliptic top disc 34, the tube-removed fiber portion $16_2$ extending from fiber cable $42_2$ is wound (N+1) turns in the clockwise direction (when N=3, (N+1)=4). Thereafter, the optical fiber coil is thrust against the upper winding core 32 with a fiber coil holder member $46_2$ pressure inserted in between the center partition disc 30 the elliptic top disc 34.

Next, as shown in FIG. 4D, ends of the tube-removed fiber portions $16_1$ and $16_2$ are fusion-spliced by a known conventional method. The process of fusion-splicing itself is not essential to the present invention, and thus the description thereof is omitted.

Figure 4E:
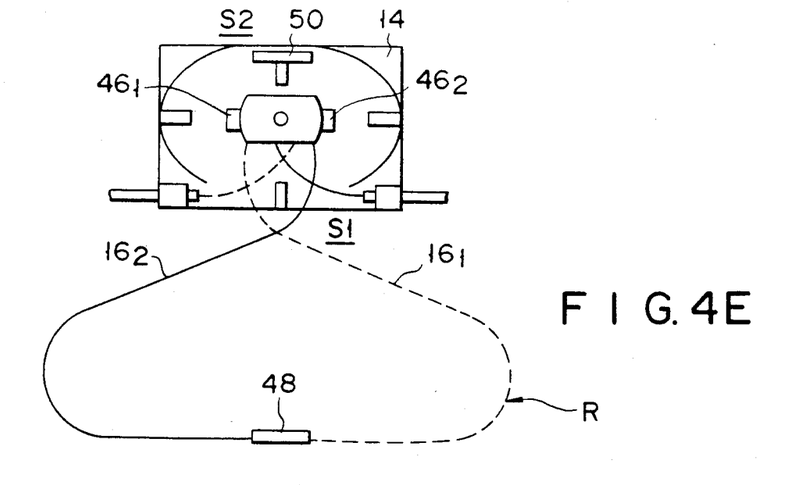

As shown in FIG. 4E, the fusion-spliced, tube-removed fiber portion is given half a turn in the counterclockwise direction while holding the fusion-spliced portion 48. Namely, the fiber portion is turned 180°. This half a turn results in lapping the fiber portion $16_2$ over the fiber portion $16_1$, with the former thus intersecting the latter, whereby a ring R is formed.

Figure 4F:
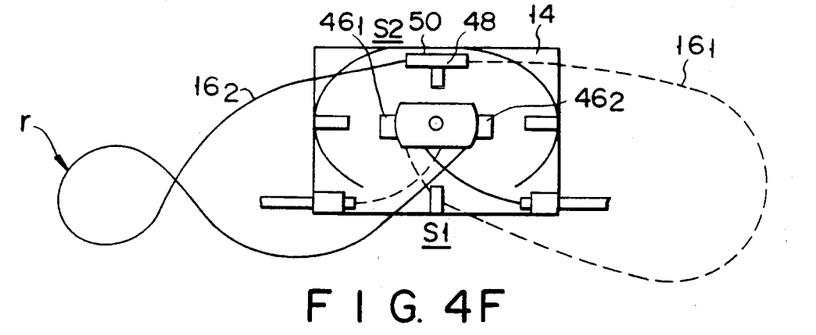

Then, as shown in FIG. 4F, with the fusion-spliced portion 48 held in the hand, the ring R is turned upside down over the casing 14 so that the ring R will come to get situated on a S2 side opposite the S1 side of the casing 14 whereby the fusion-spliced portion 48 is pressure-inserted into a coil retaining clip 50 provided in proximity of the S2 side of the casing 14 to hold the fusion-spliced portion 48 therein. The turning of the ring R upside down produces a small twisted ring r either with the tube-removed fiber portion $16_1$ or $16_2$. Therefore, the operator involved is required to turn the ring R upside down as shown in FIG. 4F so that the small twisted ring r may come into existence with either of the tube-removed fiber portions, whichever is greater in the number of turns, namely with the fiber portion $16_2$ with (N+1) turns in this embodiment of the present invention.

Figure 4G:
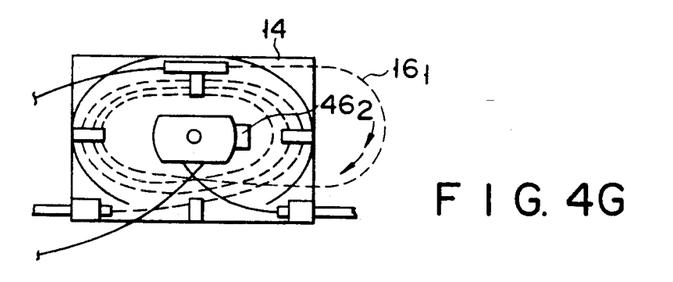

Next, as shown in FIG. 4G, the fiber coil holder member $46_1$ for the fiber portion 161 is removed to release the fiber coil which has thus far been thrust against the lower winding core 28. Under this condition, the fiber portion $16_1$ lying outside the casing 14 is fed inside the casing so as to expand the size of the fiber coil.

Figure 4H:
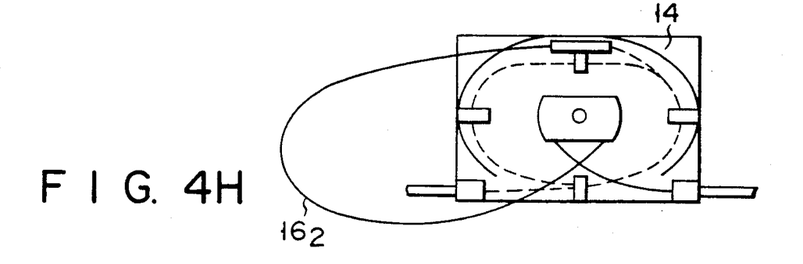

Thereafter, as shown in FIG. 4H, the coil holder member $46_2$ provided for the tube removed fiber portion $16_2$ is removed thereby to release the fiber coil held thrust against the upper winding core 32, and one turn of the coil is taken off not only to make equal the number of turns with the N turns of the fiber coil $16_1$ but also to make the small twisted ring r disappear. In this condition, the tube-removed fiber portion $16_2$ outside the casing 14 is fed into the casing thereby to enlarge the size of the coil. After feeding the fiber portion $16_2$ into the casing 14, the coil forming jig 22 is removed from the casing 14, and a cover (not shown) is set in position.

Following the method referred to above, the tube-removed fiber portions $16_1$ and $16_2$ are wound around the lower and upper winding cores 28 and 32 without ring twisted since the ends of the tube-removed fiber portions are free when these fiber portions are wound around the winding cores, and a twist generated in a winding process undergoes offsetting in the subsequent winding process, thereby disappearing, whereby a twist-free ring is finally obtained.

In the above embodiment, the step of taking off one turn of the fiber coil of the tube-removed fiber portion $16_2$ is performed after the step of turning the ring R of the tube-removed fiber portion upside down is performed. However, these steps can be reversed. Specifically, after the step of turning the tube removed fiber portion half a turn to form the ring R, the coil holder member $46_2$ is removed to release the fiber coil of the tube-removed fiber portion $16_2$ thrust against the upper winding core 32, and one turn of the fiber coil is taken off to make equal the number of turns with the N turns of the fiber coil of the tube-removed fiber portion $16_1$. Thereafter, with the fusion-spliced portion 48 held in the hand, the ring R is turned upside down over the casing 14 so that the ring R will come to get situated on a S2 side opposite the S1 side of the casing 14 whereby the fusion-spliced portion 48 is pressure-inserted into a coil retaining clip 50. Next, the fiber coil holder member $46_1$ for the fiber portion $16_1$ is removed to release the fiber coil thrust against the lower winding core 28.

Next, by reference to either FIG. 5A to FIG. 5G, another embodiment of the present invention is described.

Figure 5A:
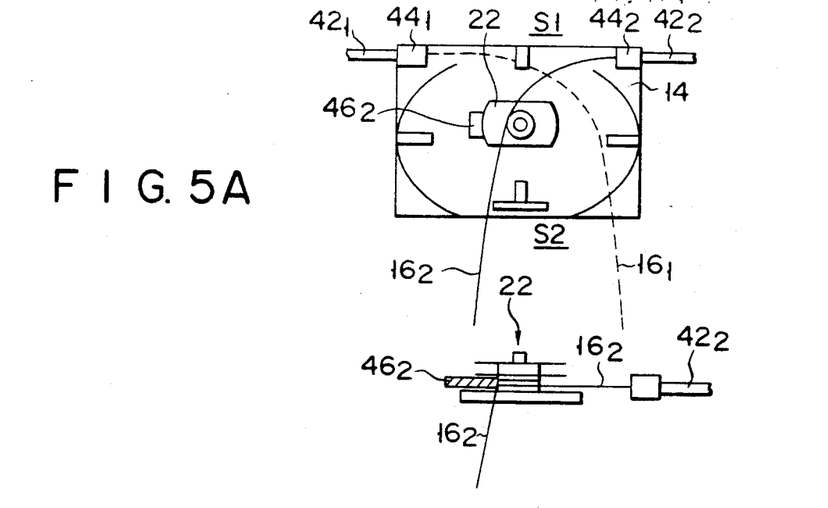
FIGS. 5A-5G show another sequence of encasing an optical fiber in a casing.

As shown in FIG. 5A, using the engaging clamp means $44_1$ and $44_2$ arranged at the left and right corners of a side S1 of the rectangular casing 14, a pair of optical fiber cables $42_1$ and $42_2$ are fixed in their places. The tube-removed fiber portions $16_1$ and $16_2$ extend from the optical fiber cables $42_1$ and $42_2$, respectively. Thereafter, the tube-removed fiber portion $16_2$ is wound N turns in the counterclockwise direction (in case the length of the tube removed fiber portion is 1 meter, 3 turns) around the lower winding core 28 between the ellipsoidal base 24 and the center partition elliptic disc 30 of the coil forming jig removably mounted at the central part of the contain case 14. Then, the optical fiber coil at the lower winding core 28 is thrust against the lower winding core 28 by pressure-inserting the coil holder member $46_2$ in between the ellipsoidal base and the center partition elliptic disc. The remainder of the tube-removed fiber portion $16_2$ is extended to the side S2 opposite the side S1 of the casing 14.

Figure 5B:
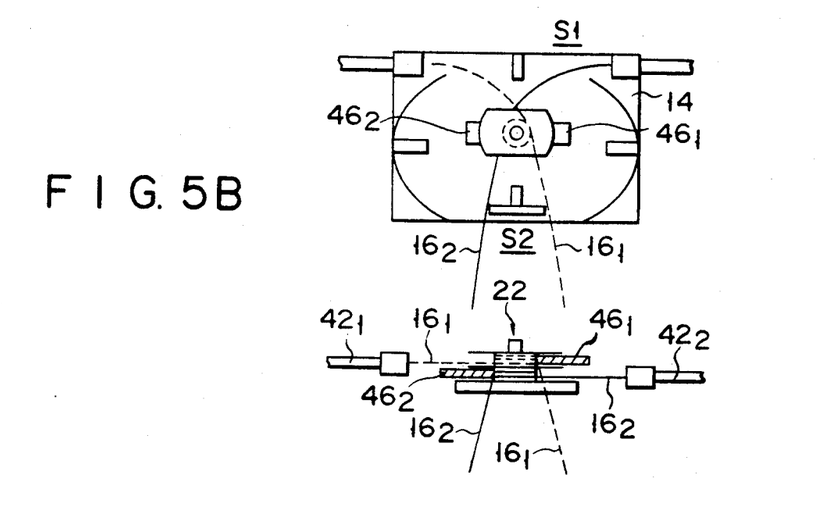

Next, as shown in FIG. 5B, the tube-removed fiber portion $16_1$ is wound about the upper winding core 32 between the center partition elliptic disc 30 and the elliptic top disc 34 of the coil forming jig 22 the same number of turns as with the tube-removed fiber portion $16_2$ in the clockwise direction. Then, the optical fiber coil at the upper winding core 32 is thrust against the upper winding core 32 by pressure inserting the coil holder member $46_1$ in between the center partition elliptic disc and the elliptic top disc. The remainder of the tube-removed fiber portion $16_1$ is extended to the side S2 of the casing 14.

Figure 5C:
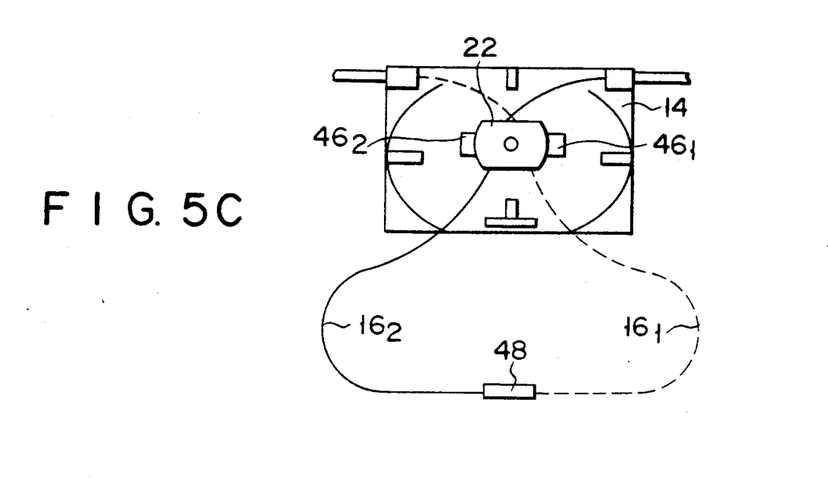

Next to the above, as illustrated in FIG. 5C, the ends of the tube-removed fiber portions $16_1$ and $16_2$ are fusion-spliced according to a known conventional method.

To prepare for this fusion-splicing, the coating layers of the tip portions of the fiber portions $16_1$ and $16_2$ are removed, and the ends of the fiber portions are aligned in a line and fusion-spliced using arc discharge. The process of fusion-splicing is not within the scope of the present invention, and thus the detailed description thereof being omitted.

Figure 5D:
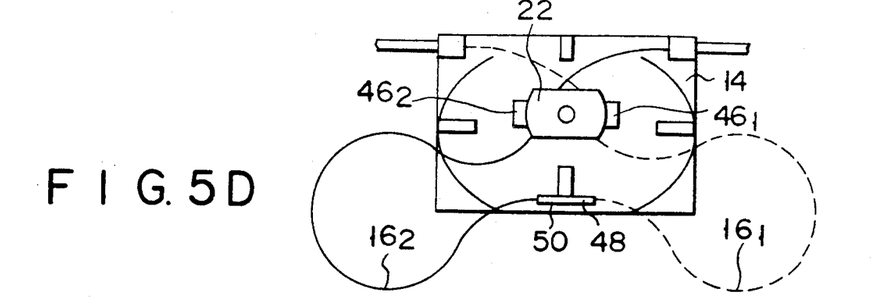

Then, as shown in FIG. 5D, the fusion-spliced portion 48 is pressure-inserted into the coil holding clip 50 for fixing thereto which is provided in proximity to the side $S_2$ of the casing 14.

Figure 5E:
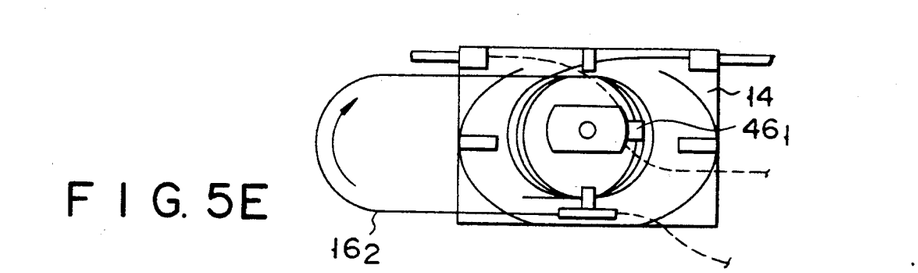

Thereafter, as shown in FIG. 5E, the fiber coil holder member $46_2$ for use with the optical fiber cable $16_2$ is removed to release the optical fiber coil thus far held thrust against the lower winding core 28. Under this condition, the tube-removed fiber portion $16_2$ staying outside the casing 14 is drawn into the casing to expand the size of the fiber coil.

Figure 5F:
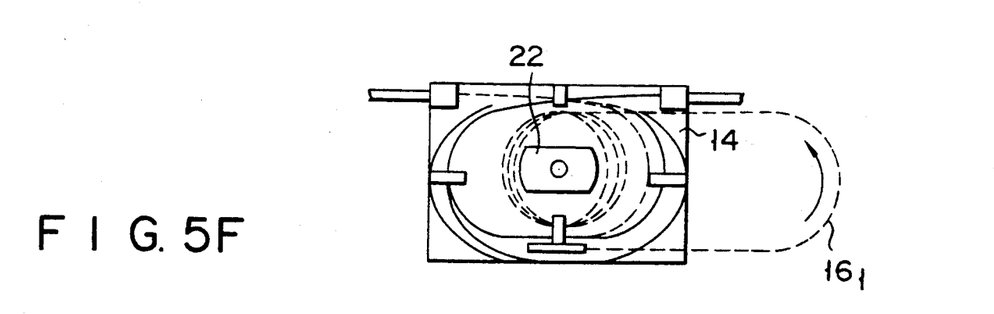
Figure 5G:
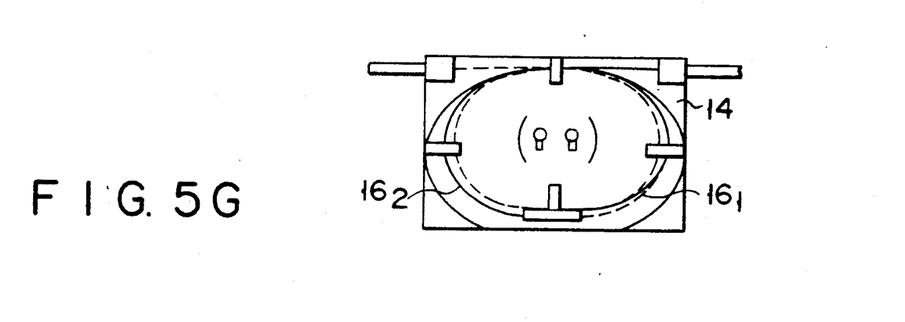

Following the steps above, as shown in FIG. 5F, the coil holder member $46_1$ for use with the tube-removed fiber portion $16_1$ is removed thereby to release the optical fiber coil, which has so far been kept thrust against the upper winding core 32. Under this condition, the tube-removed fiber portions $16_1$ lying outside the casing 14 is drawn into the casing thereby to increase the size of the optical fiber coil.

Expanding the size of the optical fiber coils results in separating the tube-removed fiber portions sufficiently from the coil forming jig 22 whereby it becomes practicable at this stage to take out the coil forming jig 22 from the casing 14, followed by placing the cover (not shown) in position to close the casing.

Figure 6:
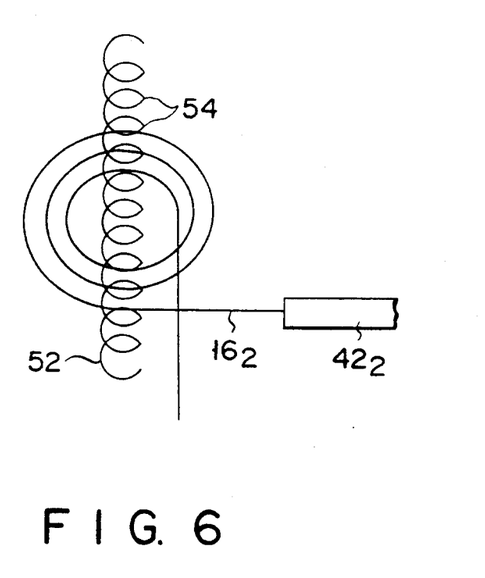
FIG. 6 shows another coil forming jig.

Though in the above embodiments of the prevent invention, a wound-core type shown in FIG. 3 is employed for the coil forming jig, a coil spring type shown in FIG. 6 may be applied to substitute for the wound core type. The coil spring type coil forming jig is characterized by its outstanding simple construction. A coil spring 52 with a tight winding structure is favorable so that a tube-removed fiber portion may be wound spirally while being caught between each neighboring two of the turns 54. After winding the fiber portion to a predetermined number of turns, the coil thus formed is fixed temporarily to the coil spring 52, using an engaging clamp members such as a clip, and so forth or an adhesive tape. In FIG. 6, no other fiber portion than one is presented but, in actuality, two fiber portions experience similar winding with the coil spring 52 as described above, with the fiber coils thus formed being fixed temporarily to the coil spring 52. Thereafter, the ends of the remainder of the tube-removed fiber portions are fusion-spliced to each other, and the temporarily fixing members are removed from the coil spring 52 so as to take out the coils into which two fiber portions are wound, from the coil spring, followed by being encased in the casing 14.

Figure 7A:
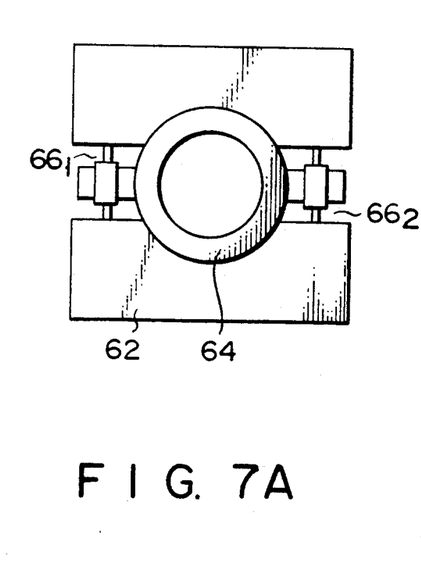
FIG. 7A shows a top plan view of a further coil forming jig.
Figure 7B:
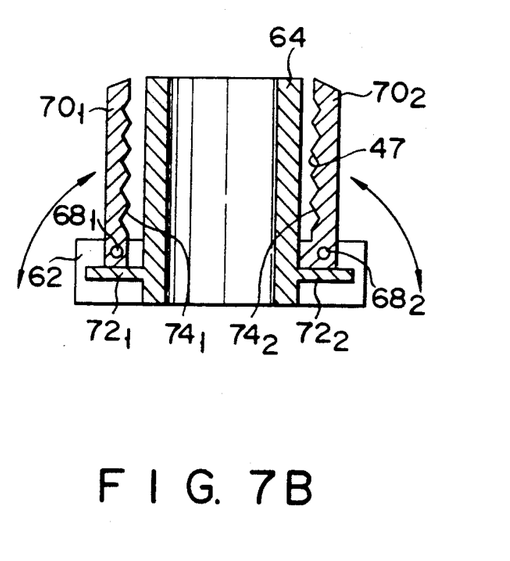
FIG. 7B shows a cross sectional view of the further coil forming jig shown in FIG. 7A.

Shown in FIGS. 7A and 7B is another example of the coil forming jig 22. These two FIGURES give a plan view and a cross-sectional view of the another embodiment of the coil forming jig. The coil forming jig defined in this example is characterized in that the jig provides service with great ease of temporarily fixing the fiber coil to the jig as well as of releasing the fiber coil from the jig. Structurally precise with this coil forming jig, it comprises a base 62, a cylindrical optical fiber winding core 64 integrally formed with the base 62 and which extends upward from the center part of the base 62, and optical fiber holding levers $70_1$ and $70_2$, pivottaly mounted to the base with respective pins $68_1$ and $68_2$. The lower ends of the pins $68_1$ and $68_2$ are set in left and right notches $66_1$ and $66_2$ provided in the base 62. Into these notches $66_1$ and $66_2$, a pair of flexible tongues $72_1$ and $72_2$ extend respectively left and right outward in the radial direction from the lower end of the optical fiber winding core 64. The tongues $72_1$ and $72_2$ hold the lower ends of the optical fiber holding levers $70_1$ and $70_2$, respectively, thereby to maintain these optical fiber holding levers at their vertical positions. When the optical fiber holding levers $70_1$ and $70_2$ are brought down in the radial directions outwardly as shown by the arrows in resistance against the flexibility of the tongues $72_1$ and $72_2$, the tongues $72_1$ and $72_2$ come into contact with the outside peripheries of the optical fiber holding levers $70_1$ and $70_2$, whereby these optical fiber holding levers $70_1$ and $70_2$ are maintained horizontally.

The tube-removed fiber portion is wound a predetermined number of turns around the optical fiber winding core of the coil forming jig. The fiber portion wound into a coil is pressed against the optical fiber winding core 64 by means of the optical fiber holding levers $70_1$ and $70_2$, whereby the fiber coil is held around the winding core. In this case, one tube-removed fiber portion is wound in one direction around the lower part of the winding core, while the other tube-removed fiber portion is wound in the opposing direction around the upper part of the winding core. Thereafter, the ends of the tube-removed fiber portions wound into coils are fusion-spliced to each other by a known conventional method.

With a plurality of V-grooves $74_1$ and another plurality of V-grooves $74_2$ provided in the inside peripheries of the optical fiber holding levers $70_1$ and $70_2$, and which extend in the circumferential direction, it becomes feasible that a coil-formed fiber portions are held further positively around the optical fiber winding core.

In case where the coil forming jig shown in FIG. 3 is used, it is permissible that a tube-removed fiber portion is wound around the winding core while securing the coil forming jig outside the casing 14 using certain means, and pressed against the winding core by the fiber core holder members $46_1$ and $46_2$. Under this condition, the coil forming jig is attached inside the casing 14.

On the other hand, where the coil forming jig shown in each of FIGS. 6, 7A and 7B is employed, it is allowed to wind either one tube-removed fiber portion $16_1$ or $16_2$ around one each coil forming jig. Alternatively, two tube-removed fiber portions $16_1$ and $16_2$ may be wound commonly around one coil forming jig.

It is preferable to secure the coil forming jig shown respectively in FIGS. 2, 6, 7A and 7B outside the casing 14 using some proper means to easily perform the respective steps of winding a tube-removed fiber portion around the fiber coil winding core, and encasing the coilformed fiber portion in the casing 14 under the condition that the coilformed fiber portion is fixed to the winding core, resulting in providing ease of encasing the coilformed fiber portion, compared with the case wherein fiber coil encasing is done with the coil forming jig set within the casing 14.

The method of the present invention eliminates the need of altering a conventional casing and allows repetitive use of the coil forming jig around which the tube-removed fiber portion is wound, whereby the running cost required for embodying the present invention may be maintained small without raising the production cost of the casing.

In addition, according to the method of the present invention, both optical fibers $16_1$ and $16_2$ can be wound around the coil forming jig without being subjected to twisting, whereby ease is provided for expanding the size of a coilformed fiber portion within the casing.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of preventing twisting of a fusion-spliced optical fiber when the optical fibers are encased in a casing, the method comprising the steps of:
   (a) disposing a coil forming member at a central part of said casing;
   (b) winding a first one of a pair of optical fibers in a given direction around a first part of said coil forming member, a predetermined number of turns being wound around said coil forming member to form a first coil;
   (c) restricting said first coil from expanding due to flexibility of the optical fiber thereof, by holding the first coil around said coil forming member;
   (d) winding a second one of said pair of optical fibers, said second one of said optical fibers being wound, said predetermined number of turns around a second part of said coil forming member, in a direction opposite to said given direction to form a second coil;
   (e) restricting said second coil from expanding due to flexibility of the optical fiber thereof, by holding the second coil around said coil forming member;
   (f) fusion-splicing ends of a remainder portion of each of said pair of optical fibers to form a fusion-spliced portion;
   (g) fixing said fusion-spliced portion within said casing;
   (h) releasing said restricted first and second coils; and
   (i) pushing said remainder portions of said pair of optical fibers into said casing to expand said first and second coils.

2. A method of preventing twisting of a fusion-spliced optical fiber when the optical fiber is encased in a casing, the method comprising the steps of:
   (a) winding a first one of a pair of optical fibers in a given direction, a predetermined number of turns being wound around a first part of a coil forming member to form a first coil;
   (b) restricting the first coil from expanding due to flexibility of the optical fiber thereof, by locking said first coil to said coil forming member;
   (c) winding a second of said pair of optical fibers, said predetermined number of turns of said second optical fiber being wound around a second part of said coil forming member in a direction opposite to said given direction to form a second coil;
   (d) restricting said second coil from expanding due to flexibility of the optical fiber thereof, by locking said second coil to said coil forming member;
   (e) fusion-splicing ends of a remainder portion of each of said pair of optical fibers to form a fusion-spliced portion;
   (f) disposing said coil forming member, around which said pair of optical fibers have been wound, in said casing;
   (g) fixing said fusion-spliced portion within said casing;
   (h) releasing said restricted first and second coils; and
   (i) pushing said remainder portions of said pair of optical fibers into said casing to expand said first and second coils.

3. A method of preventing twisting of a fusion-spliced optical fiber when the optical fiber is encased in a casing, the method comprising the steps of:
   (a) winding a first of a pair of optical fibers N turns in a given direction to form a first coil;
   (b) restricting the first coil from expanding due to flexibility of the optical fiber thereof;
   (c) winding a second of said pair of optical fibers (N+1) turns in a direction opposite to said given direction to form a second coil;
   (d) restricting the second coil from expanding due to flexibility of the optical fiber thereof;
   (e) fusion-splicing ends of a remainder portion of each of said pair of optical fibers to form a fusion-spliced fiber with a fusion-spliced portion;
   (f) turning said fusion spliced portion half a turn in said given direction to form said fusion-spliced fiber into a ring;
   (g) turning said ring of the fusion-spliced fiber upside down;
   (h) fixing said fusion-spliced portion within said casing;
   (i) releasing said restricted second coil;
   (j) removing one of said (N+1) turns from said second coil so that the number of turns of the second coil is reduced to equal said N turn of said first coil;
   (k) releasing said restricted first coil; and
   (l) pushing said remainder portions of said pair of optical fibers into said casing to expand said first and second coils.

4. A method of preventing twisting of a fusion-spliced optical fiber when the optical fiber is encased in a casing, the method comprising the steps of:
   (a) disposing a coil forming member at a central part of said casing
   (b) winding a first of a pair of optical fibers in a given direction around a first part of the coil forming member N turns to form a first coil;
   (c) restricting said first coil from expanding due to flexibility of the optical fiber thereof, by holding the first coil around said coil forming member;
   (d) winding a second of said pair of optical fibers (N+1) turns around a second part of said coil forming member in a direction opposite to said given direction;
   (e) restricting said second coil from expanding due flexibility of the optical fiber thereof, by holding the second coil around said coil forming member;
   (f) fusion-splicing ends of a remainder portion of each of said pair of optical fibers to form a fusion-spliced fiber with a fusion-spliced portion;
   (g) turning said fusion-spliced portion half a turn in said given direction to form said fusion-spliced fiber into a ring;
   (h) turning said ring of the fusion-spliced fiber upside down over said casing;
   (i) fixing said fusion-spliced portion within said casing;
   (j) releasing said restricted second coil;
   (k) removing one of said (N+1) turns from said second coil so that the number of turns of the second coil equal the N turns of said first coil;
   (l) releasing said restricted first coil; and
   (m) pushing said remainder portions of said pair of optical fibers into said casing to expand said first and second coils.

5. A method of preventing twisting of a fusion-spliced optical fiber when the optical fiber is encased in a casing, the method comprising:
 (a) winding a first of a pair of optical fibers N turns in a given direction around a first part of a coil forming member to form a first coil;
 (b) restricting the first coil from expanding due to flexibility of the optical fiber thereof, by locking said first coil to said coil forming member;
 (c) winding a second of said pair of optical fibers (N+1) turns around a second part of said coil forming member in a direction opposite to said given direction, to form a second coil;
 (d) restricting the second coil from expanding due to flexibility of the optical fiber thereof, by locking said second coil to said coil forming member;
 (e) fusion-splicing ends of a remainder portion of each of said pair of optical fibers to form a fusion-spliced fiber with a fusion-spliced portion;
 (f) disposing said coil forming member, around which said optical fibers have been wound, in said casing;
 (g) turning said fusion spliced portion half a turn in said given direction to form said fusion-spliced fiber into a ring;
 (h) turning said ring of the fusion-spliced fiber upside down over said casing;
 (i) fixing said fusion-spliced portion within said casing;
 (j) releasing said restricted second coil;
 (k) removing one turn from the (N+1) turns of said second coil so that the number of turns of the second coil is reduced to equal the N turns of said first coil;
 (l) releasing said restricted first coil; and
 (m) pushing said remainder portions of said pair of optical fibers into said casing to expand said first and second coils.

6. The method according to claim 3, wherein said step of turning said fusion-spliced fiber ring upside down is performed such that a ring is formed in said second optical fiber.

7. The method according to claim 4, wherein said step of turning said fusion-spliced fiber ring upside down is performed such that a ring is formed in said second optical fiber.

8. The method according to claim 5, wherein said step of turning said fusion-spliced fiber ring upside down is performed such that a ring is formed in said second optical fiber.

9. A method of preventing twisting of a fusion-spliced optical fiber when the optical fiber is encased in a casing, the method comprising the ordered steps of:
 (a) winding a first of a pair of optical fibers N turns in a given direction to form a first coil;
 (b) restricting the first coil from expanding due to flexibility of the optical fiber thereof;
 (c) winding a second of said pair of optical fibers (N+1) turns in a direction opposite to said given direction to form a second coil;
 (d) restricting the second coil from expanding due to flexibility of the optical fiber thereof;
 (e) fusion-splicing ends of a remainder portion of each of said pair of optical fibers to form a fusion-spliced fiber with a fusion-spliced portion;
 (f) turning said fusion-spliced fiber portion half a turn in said given direction to form said fusion-spliced fiber into a ring;
 (g) releasing said restricted second coil;
 (h) removing one turn from said second coil so that the (N+1) turns of the second coil is reduced to equal said N turns of said first coil;
 (i) turning said ring of the fusion-spliced fiber portion upside down;
 (j) fixing said fusion-spliced portion within said casing;
 (k) releasing said restricted first coil; and
 (l) pushing said remainder portions of said pair of optical fibers into said casing to expand said first and second coils.

10. A method of preventing twisting of a fusion-spliced optical fiber when the optical fiber is encased in a casing, the method comprising the ordered steps of:
 (a) disposing a coil forming member at a central part of said casing;
 (b) winding a first of a pair of optical fibers in a given direction around a first part of the coil forming member N turns to form a first coil;
 (c) restricting said first coil from expanding due to flexibility of the optical fiber thereof, by holding the first coil around said coil forming member;
 (d) winding a second of said pair of optical fibers (N+1) turns around a second part of said coil forming member in a direction opposite to said given direction;
 (e) restricting said second coil from expanding due to flexibility of the optical fiber thereof, by holding the second coil around said coil forming member;
 (f) fusion-splicing ends of a remainder portion of each of said pair of optical fibers to form a fusion-spliced fiber with a fusion-spliced portion;
 (g) turning said fusion-spliced portion half a turn in said given direction to form said fusion-spliced fiber into a ring;
 (h) releasing said restricted second coil;
 (i) removing one turn from said second coil so that the (N+1) turns of the second coil is reduced to equal the N turns of said first coil;
 (j) turning said ring of the fusion-spliced fiber upside down over said casing;
 (k) fixing said fusion-spliced portion within said casing;
 (l) releasing said restricted first coil; and
 (m) pushing said remainder portions of said pair of optical fibers into said casing to expand said first and second coils.

11. A method of preventing twisting of a fusion-spliced optical fiber when the optical fiber is encased in a casing, the method comprising the ordered steps of:
 (a) winding a first of a pair of optical fibers N turns in a given direction around a first part of a coil forming member to form a first coil;
 (b) restricting the first coil from expanding due to flexibility of the optical fiber thereof, by locking said first coil to said coil forming member;
 (c) winding a second of said pair of optical fibers (N+1) turns around a second part of said coil forming member in a direction opposite to said given direction, to form a second coil;
 (d) restricting the second coil from expanding due to flexibility of the optical fiber thereof, by locking said second coil to said coil forming member;
 (e) fusion-splicing ends of a remainder portion of each of said pair of optical fibers which are not wound to each other, to form a fusion-spliced fiber with a fusion-spliced portion;
 (f) disposing said coil forming member in said casing;

(g) turning said fusion-spliced portion half a turn in said given direction to form said fusion-spliced fiber into a ring;
(h) releasing said restricted second coil;
(i) removing one turn from said second coil so that the (N+1) turns of the second coil is reduced to equal the N turns of said first coil;

(j) turning said ring of the fusion-spliced fiber upside down over said casing;
(k) fixing said fusion-spliced portion within said casing;
(l) releasing said restricted first coil; and
(m) pushing said remainder portions of said pair of optical fibers into said casing to expand said first and second coils.

* * * * *

UNITED STATES PATENT AND TRADEMARK OFFICE
CERTIFICATE OF CORRECTION

PATENT NO. : 5,163,988
DATED : November 17, 1992
INVENTOR(S) : SETAISHI et al

It is certified that error appears in the above-identified patent and that said Letters Patent is hereby corrected as shown below:

Title page, Section [75] Inventors -

Change the address of the third inventor, Masao OOBA, from "Kokybunji, Japan" to --Kokubunji, Japan--.

Signed and Sealed this

Sixteenth Day of November, 1993

Attest:

BRUCE LEHMAN

Attesting Officer

Commissioner of Patents and Trademarks